(12) United States Patent
Whitworth et al.

(10) Patent No.: US 6,512,393 B1
(45) Date of Patent: Jan. 28, 2003

(54) METHOD AND APPARATUS FOR NON-LINEAR TERMINATION OF A TRANSMISSION LINE

(75) Inventors: Adam J. Whitworth, Sunnyvale; Anthony Russell, San Jose, both of CA (US)

(73) Assignee: California Micro Devices, Inc., Milpitas, CA (US)

( * ) Notice: Subject to any disclaimer, the term of this patent is extended or adjusted under 35 U.S.C. 154(b) by 42 days.

(21) Appl. No.: 09/714,778

(22) Filed: Nov. 15, 2000

(51) Int. Cl.[7] .............................................. H03K 17/16
(52) U.S. Cl. .............................. 326/30; 326/83; 326/89
(58) Field of Search ............................... 326/30, 83, 86, 326/89, 90

(56) References Cited

U.S. PATENT DOCUMENTS

| | | | | |
|---|---|---|---|---|
| 5,227,677 A | * | 7/1993 | Furman ........................ | 326/30 |
| 6,100,713 A | * | 8/2000 | Kalb et al. .................... | 326/30 |
| 6,127,840 A | * | 10/2000 | Coteus et al. ................. | 326/30 |
| 6,239,619 B1 | * | 5/2001 | Yuan et al. .................... | 326/30 |
| 6,275,088 B1 | * | 8/2001 | Jain ............................. | 326/30 |

* cited by examiner

Primary Examiner—Don Phu Le
(74) Attorney, Agent, or Firm—Beyer Weaver & Thomas LLP

(57) ABSTRACT

An active termination circuit for clamping a signal on a transmission line in an electronic device is described. The active termination circuit is configured to clamp the signal on the transmission line to one of a first reference voltage level and a second reference voltage level. The active termination circuit includes a bottom clamping transistor having a bottom clamping transistor first node coupled to a transmission line at a transmission line node, a bottom clamping transistor second node coupled to a first potential, and a bottom clamping transistor control node coupled to a first bias voltage supply. The circuit also includes a top clamping transistor having a top clamping transistor first node coupled to the transmission line at the transmission line node, a top clamping transistor second node coupled to a second potential, and a top clamping transistor control node coupled to a second bias voltage supply. The circuit further includes a variable current source arranged to provide bias current as needed to only one or the other of the first bias voltage supply and the second bias voltage supply based upon the state of an input signal on the transmission line.

13 Claims, 6 Drawing Sheets

METHOD AND APPARATUS FOR NON-LINEAR TERMINATION OF A TRANSMISSION LINE

BACKGROUND OF THE INVENTION

1. Field of the Invention

The present invention relates to termination circuits and methods therefor. More particularly, the present invention relates to termination circuits that provide fast and efficient clamping for signals transmitted via transmission lines in electronic systems.

2. Description of Relevant Art

In the design and implementation of electronic systems (such as digital computers, consumer/commercial electronic devices, or the like), particularly those employing integrated circuits, undesired transmission line effects are of a particular concern. As signals travel down transmission lines, e.g., traces on a printed circuit board, reflections may occur on the lines. The reflections are due to, for example, mismatched impedances between the driver circuit and the line, which may cause the signal to reflect back and forth, giving rise to ringing. These reflections and other undesired transmission lines effect are exacerbated as the operating speed of the signal increases. If left uncorrected, the reflections may cause the signal's voltage to swing outside of the defined "0" or "1" voltage levels, thereby causing the receiving device to incorrectly interpret the signal received and generate erroneous results.

To address this problem, a variety of techniques have been tried in the prior art. One such technique is shown in FIG. 1 illustrating a termination circuit 100 includes a top active clamping device 102 and a bottom active clamping device 104. In the circuit 100, the top active clamping device 102 is implemented by a p-channel MOS device 132 and serves to clamp the signal on a transmission line 106 at about a second reference voltage (e.g., $V_{DD}$). On the other hand, bottom active clamping device 104 is implemented by an n-channel MOS device 120 and serves to clamp the signal on transmission line 106 at a first reference voltage(e.g., ground or GND). In accordance with the convention utilized herein, the top devices are employed to clamp the voltage level of the signal on the transmission line at its upper range (e.g., to about $V_{DD}$), while the bottom devices are employed to clamp the voltage level of the signal at its lower range (e.g., to about ground).

The source of MOS device 132 can be coupled to $V_{DD}$ while the source of MOS device 120 can be coupled to ground. The drains of devices 132 and 120 are both coupled to transmission line 106 as shown. Referring now to bottom active clamping device 104, a gate 114 of MOS device 120 is coupled to both the gate and drain of a bottom threshold reference device 113 having an input impedance $r_1$. As shown in FIG. 1, bottom threshold reference device 113 includes an n-channel MOS device 118, which is arranged in a gate-to-drain connected configuration.

When sufficient current flows into the drain of n-channel MOS device 118 (the current may be sourced from any conventional current sourcing arrangement, which is shown symbolically by current source 116 in FIG. 1), gate 114 of bottom active clamping device 104 is biased at about one threshold voltage $V_T$ of n-channel MOS device 118 above ground. Typically, the voltage at gate 114 is biased at the threshold voltage $V_T$ of n-channel MOS device 118 plus a small amount of overdrive voltage necessary to sustain the current through device 118.

When the signal on transmission line 106 begins to reflect and dips below ground, i.e., as soon as the potential difference between the gate of n-channel MOS device 120 of bottom active clamping device 104 and its source exceeds $V_T$, n-channel device 120 begins to conduct to source current from its drain, which is connected to ground as shown in FIG. 1. Accordingly, the signal is clamped at about or slightly below ground. As noted, gate 114 of n-channel device 120 is typically biased slightly above $V_T$. Consequently, it is typically the case that n-channel device 120 begins to conduct when the signal on transmission line 106 is slightly above ground (e.g., perhaps 0.1 V above ground). In this manner, n-channel device 120 would be in full conduction when the signal on transmission line 106 dips below ground.

A similar arrangement exists with reference to gate 130 of the p-channel MOS device 132 of top active clamping device 102 in that the gate 130 of MOS device 132 is coupled to both the gate and drain of a bottom threshold reference device 111 having an input impedance $r_2$. More particularly, the gate 130 is coupled to the gate and drain of p-channel MOS device 134. The source of p-channel MOS device 132 is coupled to $V_{DD}$ as shown. When sufficient current flows out of the drain of p-channel device 134, gate 130 of p-channel device 132 is biased at about $V_{DD}-V_T$, where $V_T$ is the threshold voltage of p-channel MOS device 134. Actually, gate 130 of p-channel device 132 is biased slightly below this value ($V_{DD}-V_T$) due to the presence of the overdrive voltage necessary to sustain current through p-channel MOS device 134.

When the signal on transmission line 106 begins to reflect and rises above $V_{DD}$, p-channel MOS device 132 turns on to clamp this signal at about $V_{DD}$. Due to the presence of the aforementioned overdrive voltage, p-channel MOS device 132 typically turns on slightly before the voltage level of the signal on transmission line 106 reaches $V_{DD}$, thereby ensuring that p-channel MOS device 132 is fully turned on when the signal's voltage level exceeds $V_{DD}$.

As well known in the art, all junction type devices (including transistors) have intrinsic capacitance loading between the various junctions commonly referred to as parasitic capacitance. One such parasitic component particularly relevant to the inventive termination circuit are referred to as MOSFET capacitances. These parasitic components are mainly responsible for the intrinsic delay of logic gates. FIG. 2 illustrates a typical MOSFET 200 having associated junction parasitic capacitances represented as lumped elements between the device terminals. Based on their physical origins, the parasitic device capacitances can be classified into two major groups: (1) oxide-related capacitances and (2) junction capacitances. In the example shown, the gate-oxide-related capacitances are Cgd (gate-to-drain capacitance), Cgs (gate-to-source capacitance), and Cgb (gate-to-substrate capacitance). It is well known in the art that the gate-to-channel capacitance is distributed and voltage dependent, and consequently, all of the oxide-related capacitances described here changes with the bias conditions of the transistor. Note that the total gate oxide capacitance is mainly determined by the parallel-plate capacitance between the gate and the underlying structures. Hence, the magnitude of the oxide-related capacitances is very closely related to (1) the gate oxide thickness, and (2) the area of the MOSFET gate.

Referring back to FIG. 1, the gate to drain parasitic capacitance $C_{gd1}$ (associated with transistor 132) and $C_{gd2}$ (associated with transistor 120) degrade the clamping performance of the termination circuit 100 by causing the gate voltages of the clamping transistors 132 and 120 to vary in relation to the input voltage rise or fall on the transmission line 106. In some cases, this variation in gate voltage can be hundreds of millivolts.

In addition to the presence of the parasitic capacitances $C_{gd1}$ and $C_{gd2}$ that degrade the clamping performance of the termination circuit 100, DC power in excess of that required by the current source 116 is dissipated due to what is referred to as the short channel effect. Currents $I_p$ and $I_n$ are always flowing in the bias voltage generator circuits 111 and 113, respectively. However currents that may be an order of magnitude greater than bias currents $I_p$ and $I_n$ can flow in the clamping transistors when there exists both a voltage between the source and drain of greater than a threshold voltage, and also a voltage between the source and gate of approximately a threshold voltage (or more). These short channel effect currents are present whether or not that particular FET is required at a particular point in the operation of the circuit 100. For example, even though it is only the transistor 120 that is needed to clamp the transmission line 106 to ground, the transistor 132 is generating short channel current that is many times greater than $I_p$, adding unnecessarily to the DC power dissipation of the termination circuit 100.

In view of the foregoing, there are desired improved termination circuits and methods therefor that advantageously provide fast and efficient clamping for signals transmitted via transmission lines in electronic systems, particularly signals having low operating voltage ranges.

SUMMARY OF THE INVENTION

The present invention describes, in one embodiment, an active termination circuit for clamping a signal on a transmission line in an electronic device. In the described embodiment, the inventive active termination circuit includes a bottom clamping transistor having a bottom clamping transistor first node coupled to a transmission line at a transmission line input node, a bottom clamping transistor second node coupled to a first potential, and a bottom clamping transistor control node coupled to a first bias voltage supply. The circuit also includes a top clamping transistor having a top clamping transistor first node coupled to the transmission line at the transmission line input node, a top clamping transistor second node coupled to a second potential, and a top clamping transistor control node coupled to a second bias voltage supply. The circuit further includes a variable current source arranged to provide bias current as needed to only one or the other of the first bias voltage supply and the second bias voltage supply based upon the state of an input signal on the transmission line.

In another embodiment, a method of clamping a signal on a transmission line to one of a first and a second reference voltage using the active clamping circuit is described.

These and other advantages of the present invention will become apparent upon reading the following detailed descriptions and studying the various drawings.

DETAILED DESCRIPTION OF THE INVENTION

Figure 1:
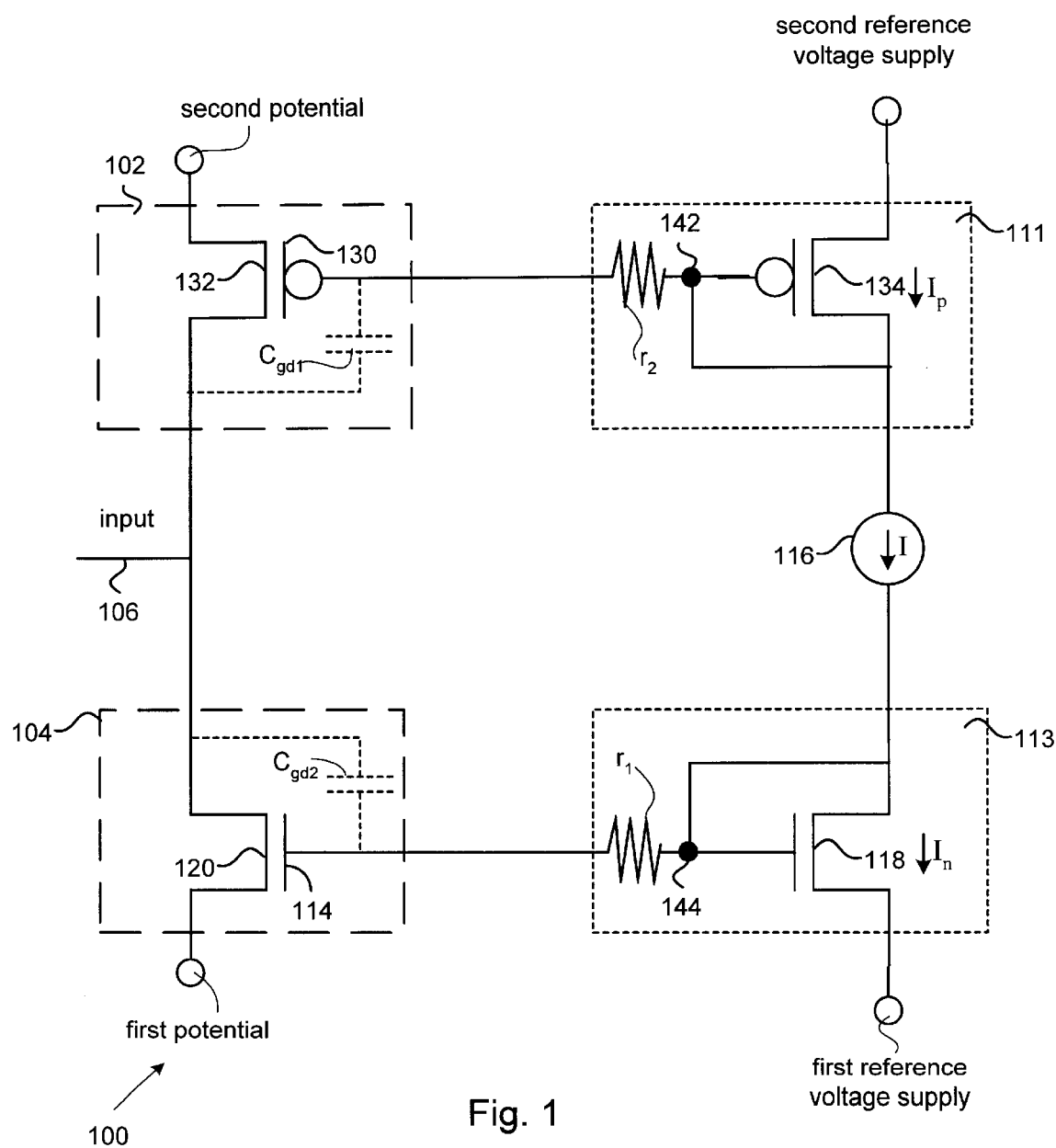
FIG. 1 illustrates a conventional termination circuit.
Figure 2:
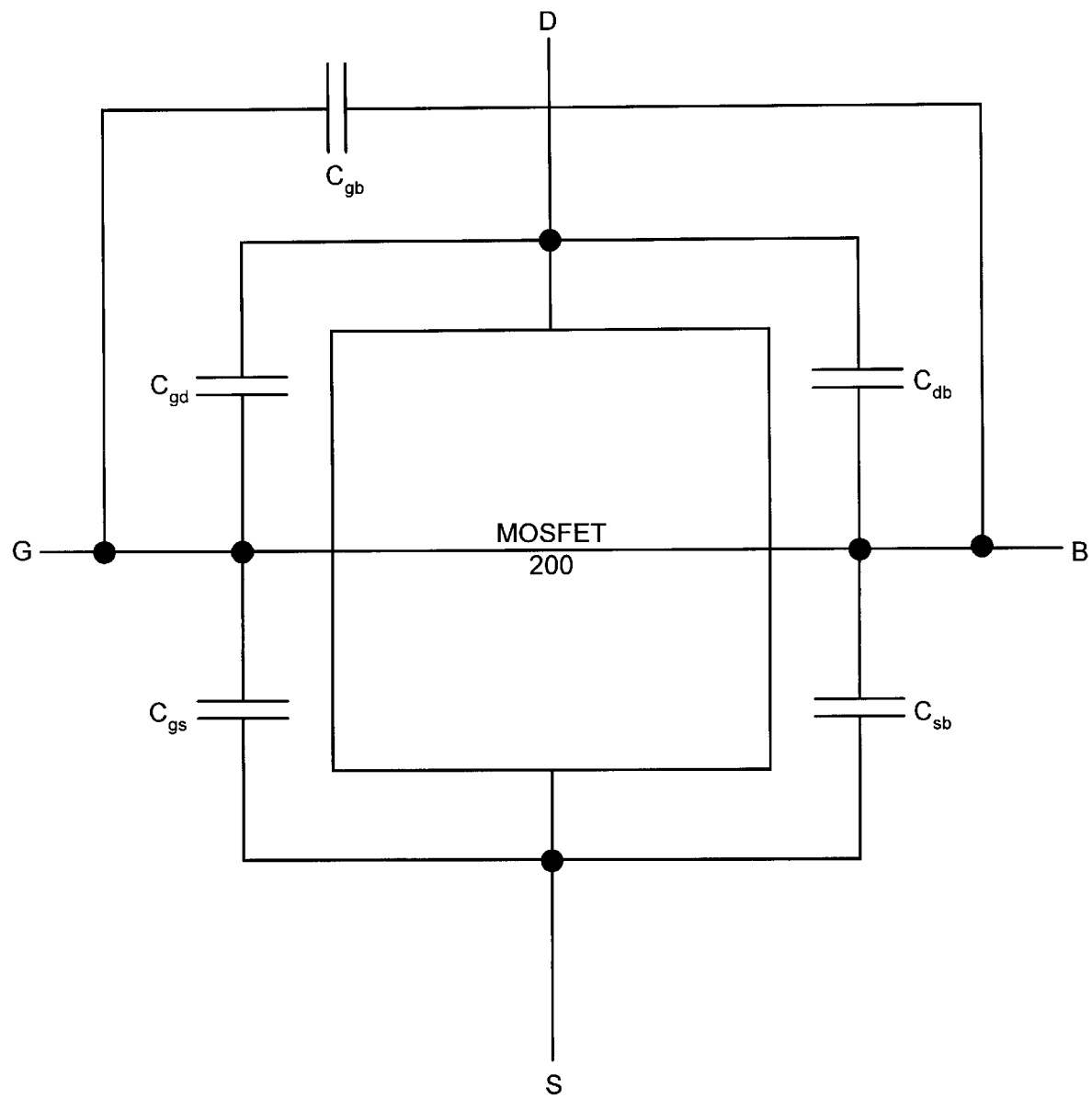
FIG. 2 illustrates a typical MOSFET having associated junction parasitic capacitances represented as lumped elements between the device terminals.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In the described embodiment, the inventive active termination circuit includes a bottom clamping transistor having a bottom clamping transistor first node coupled to a transmission line at a transmission line node, a bottom clamping transistor second node coupled to a first potential, and a bottom clamping transistor control node coupled to a first bias voltage supply. The circuit also includes a top clamping transistor having a top clamping transistor first node coupled to the transmission line at the transmission line node, a top clamping transistor second node coupled to a second potential, and a top clamping transistor control node coupled to a second bias voltage supply. The circuit further includes a variable current source arranged to provide bias current as needed to only one or the other of the first bias voltage supply and the second bias voltage supply based upon the state of an input signal on the transmission line.

In this way, when a logic transition event occurs on the transmission line, the variable current source provides an appropriate drive current for the appropriate bias voltage supply based upon the signal on the transmission line. For example, if a particular logic transition event is a low to a high (i.e., only the top clamping transistor is used to clamp the signal), then the variable current source only provides a second bias current to the second bias voltage supply concurrently with providing substantially no bias current to the first bias voltage supply thereby disabling it. With this arrangement, the overall DC power dissipation of the inventive variable current supply termination circuit is substantially reduced over conventionally configured termination circuits since only one or the other of the bias voltage supplies is operational (and thereby dissipating DC power) as needed.

The invention will now be described in terms of an active termination circuit having MOS type transistors. It should be noted, however, that any appropriate transistor technology can be used that is deemed suitable for the application at hand. For the remainder of this discussion only, therefore, the bottom and top clamping transistors are assumed to be MOS type transistors and the second potential is and the first potential are assumed to be VDD and GND, respectively. It should also be noted, that these assumptions are for the sake of this discussion only and should not be construed as limiting either the scope or intent of the invention. For example, the first and the second potentials can be any appropriate values as can be the first and the second reference voltage supplies.

Figure 3:
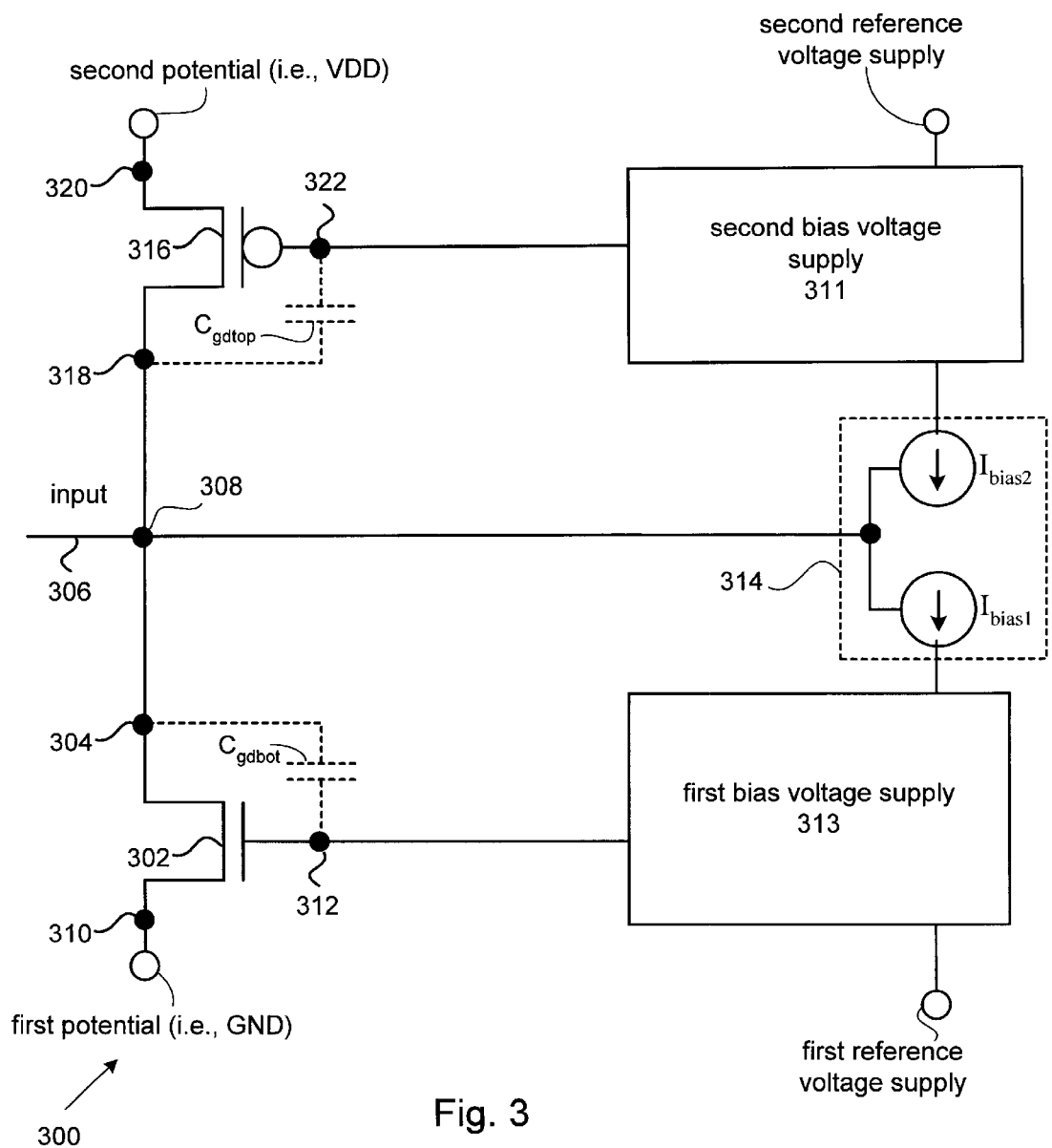
FIG. 3 illustrates a termination circuit in accordance with an embodiment of the invention.

With this in mind, FIG. 3 illustrates a termination circuit 300 in accordance with an embodiment of the invention. In the described embodiment, the termination circuit 300 includes a bottom clamping transistor 302 (with a gate to drain parasitic capacitance $C_{gdbot}$) having a bottom clamping transistor first node 304 coupled to a transmission line 306 at a transmission line input node 308, a bottom clamping transistor second node 310 coupled to a first potential, and a bottom clamping transistor control node 312 coupled to a first bias voltage supply 313. The first bias voltage supply 313 is, in turn, coupled to a first reference voltage supply and a variable bias current supply 314. The circuit 300 also includes a top clamping transistor 316 (with a gate to drain parasitic capacitance $C_{gdtop}$) having a top clamping transistor first node 318 coupled to the transmission line 306 at the transmission line input node 308, a top clamping transistor second node 320 coupled to a second potential, and a top clamping transistor control node 322 coupled to a second bias voltage supply 311. The second bias voltage supply 311 is, in turn, coupled to a second reference voltage supply and the variable bias current supply 314.

In this way, when a logic transition event occurs on the transmission line 306, the variable current supply 314 provides either a first bias current $I_{bias1}$ to the first bias voltage supply 313 or a second bias voltage supply $I_{bias2}$ to the second bias voltage supply 311 based upon an input signal on the transmission line 306. In this way, overall DC power dissipation of the circuit 300 is substantially reduced over conventional termination circuits since only one of the two bias voltage supplies is enabled at a time.

For example, during a high going type input transition event, when a signal $S_1$ on transmission line 306 begins to transition from a LOW signal, or logic "0" (approximately GND) to a logic "1" (approximately VDD), the variable current source 314 provides a second bias current $I_{bias2}$ to the second bias voltage supply 311 since it is only the top clamping transistor 316 that is used to clamp the signal $S_1$ and the first bias voltage supply 313 is disabled since a first bias current $I_{bias1}$ is zero. The same procedure assures that during a low going type input transition event, the first bias voltage supply 313 is enabled whereas the second bias voltage supply 311 is disabled. In this way, the overall DC power dissipation of the inventive active termination circuit 300 is substantially reduced over conventionally arranged termination circuits while still maintaining superior clamping performance.

Figure 4:
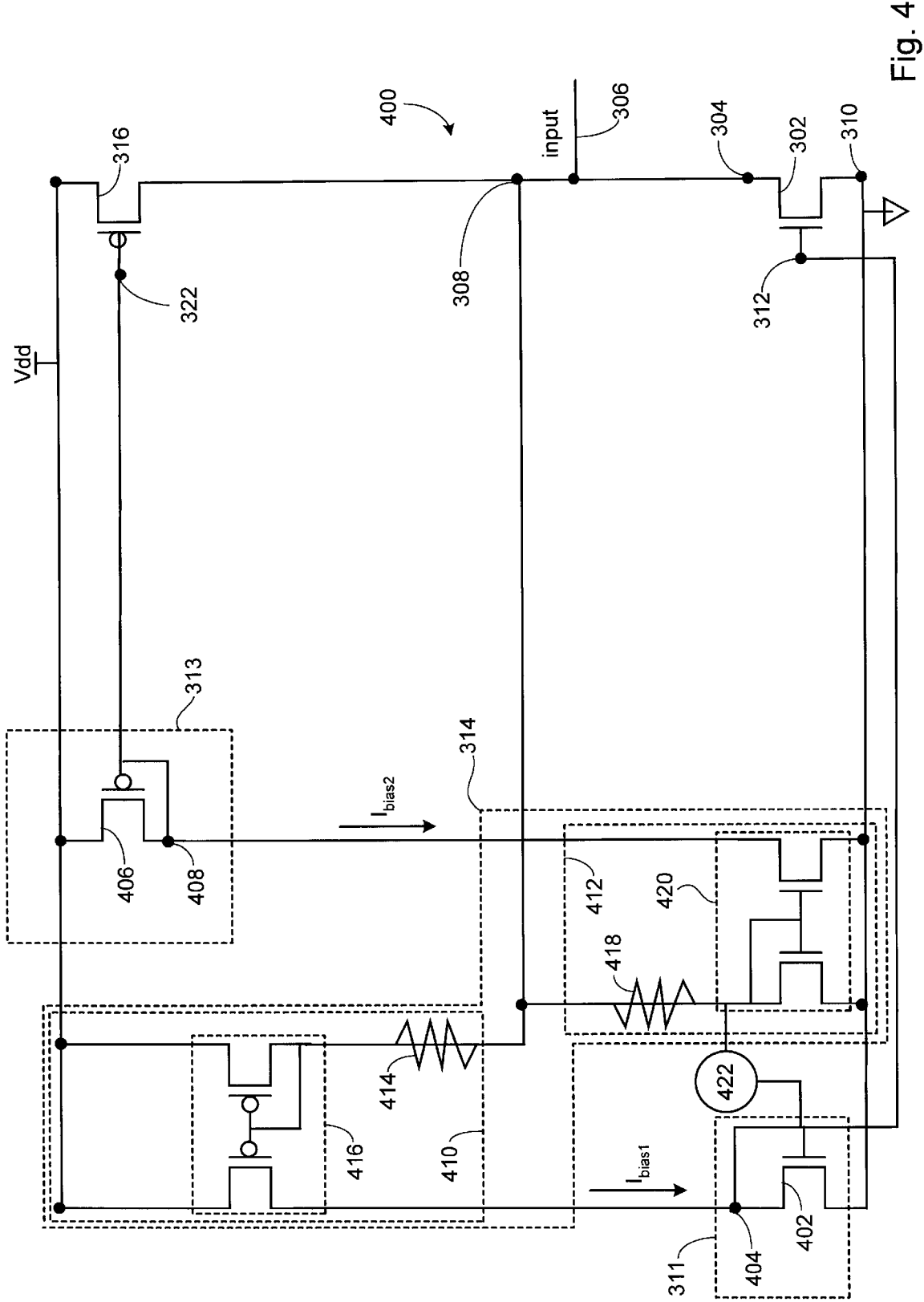
FIG. 4 illustrates a termination circuit showing a particular implementation of the termination circuit shown in FIG. 3.

FIG. 4 illustrates a termination circuit 400 showing a particular implementation of the termination circuit 300 shown in FIG. 3. It should be noted that the circuit 400 is one implementation of the termination circuit 300 and will thus be described using the aforementioned components appropriate for both circuits 300 and 400. In the described embodiment, the termination circuit 400 includes the bottom clamping transistor 302 having the bottom clamping transistor first node 304 coupled to the transmission line 306 at the transmission line input node 308, the bottom clamping transistor second node 310 coupled to GND, and the bottom clamping transistor control node (i.e., gate) 312 coupled to the first bias voltage supply 311 that, in this case, takes the form of a diode connected MOS transistor 402 having a drain 404 connected to a dynamic current supply 314. Similarly, the circuit 400 also includes the top clamping transistor 316 coupled to the transmission line 306 at the transmission line input node 308, the top clamping transistor second node 320 coupled to VDD, and the top clamping transistor control node (i.e gate) 322 coupled to the second bias voltage supply 313 that takes the form of a diode connected MOS transistor 406 having a drain 408 connected to the dynamic current supply 314.

In this implementation, the dynamic current supply 314 is formed of a first bias current generator 410 arranged to provide the first bias current $I_{bias1}$ and a second bias current generator 412 arranged to provide the second bias current $I_{bias2}$ based upon an input signal S traversing the transmission line 306. The first bias current generator 410 includes a first resistor 414 coupled to the drain 404 by way of a first current mirror 416 well known to those skilled in the art, to the node 308 and to a second resistor 418 included in the second bias current generator 412. The resistor 418 is, in turn, connected to the drain 408 by way of a second current mirror 420. It should be noted that the first current mirror 416 is formed of p-type MOS transistors whereas the second current mirror 420 is formed of n-type MOS transistors.

Using the inventive termination circuit 400 to clamp the signal S on the transmission line 306, substantial DC power savings are realized. For example, only the second bias current generator 412 is enabled to provide the second bias current $I_{bias2}$ to the transistor 406 when a signal $S_1$ on the transmission line 306 is at a logic "1", (i.e., VDD). In a similar manner, only the first bias current generator 410 is enabled to provide the first bias current $I_{bias1}$ to the transistor 402 only when the signal $S_1$ on the transmission line 306 is a logic "0" (i.e., GND).

More particularly, consider the situation when the signal $S_1$ is a logic "0". In this case, the top clamping transistor 316 will have a drain to source voltage of VDD and due to the short channel effect, the top clamping transistor 316 conducts current that is substantially greater than $I_{bias2}$. However, due to the novel characteristics of the circuit 400, when the signal $S_1$ is at logic "0", there will be substantially no current through the second resistor 418 and therefore no current in the second current mirror 420 (i.e., $I_{bias2}$ is substantially zero) and therefore, the top clamping transistor 316 is off since the voltage at the gates of the transistors 406 and 316 are VDD. In this case, the gate-to-source voltage of the top clamping transistor 316 is substantially zero (i.e., well below $V_{th}$) and therefore the top clamping transistor 316 will not effectively conduct any DC current.

It should be noted that when the signal on the transmission line 306 transitions from a logic "0" to a logic "1", there may be some delay while the gate 322 of the top clamping transistor 316 charges to $(V_{DD}-V_{th})$. It may be desirable, therefore, to add a current source 422 to provide a pre-charge current I to minimize this delay. The pre-charge current I should be small enough (approximately one hundredth of $I_{bias1}$) so the while the input voltage is at logic "0", the gate-to-source voltage of the top clamping transistor 316 is far enough below the nominal value of $V_{th}$ that neglible current flows in the top clamping transistor 316.

Figure 5:
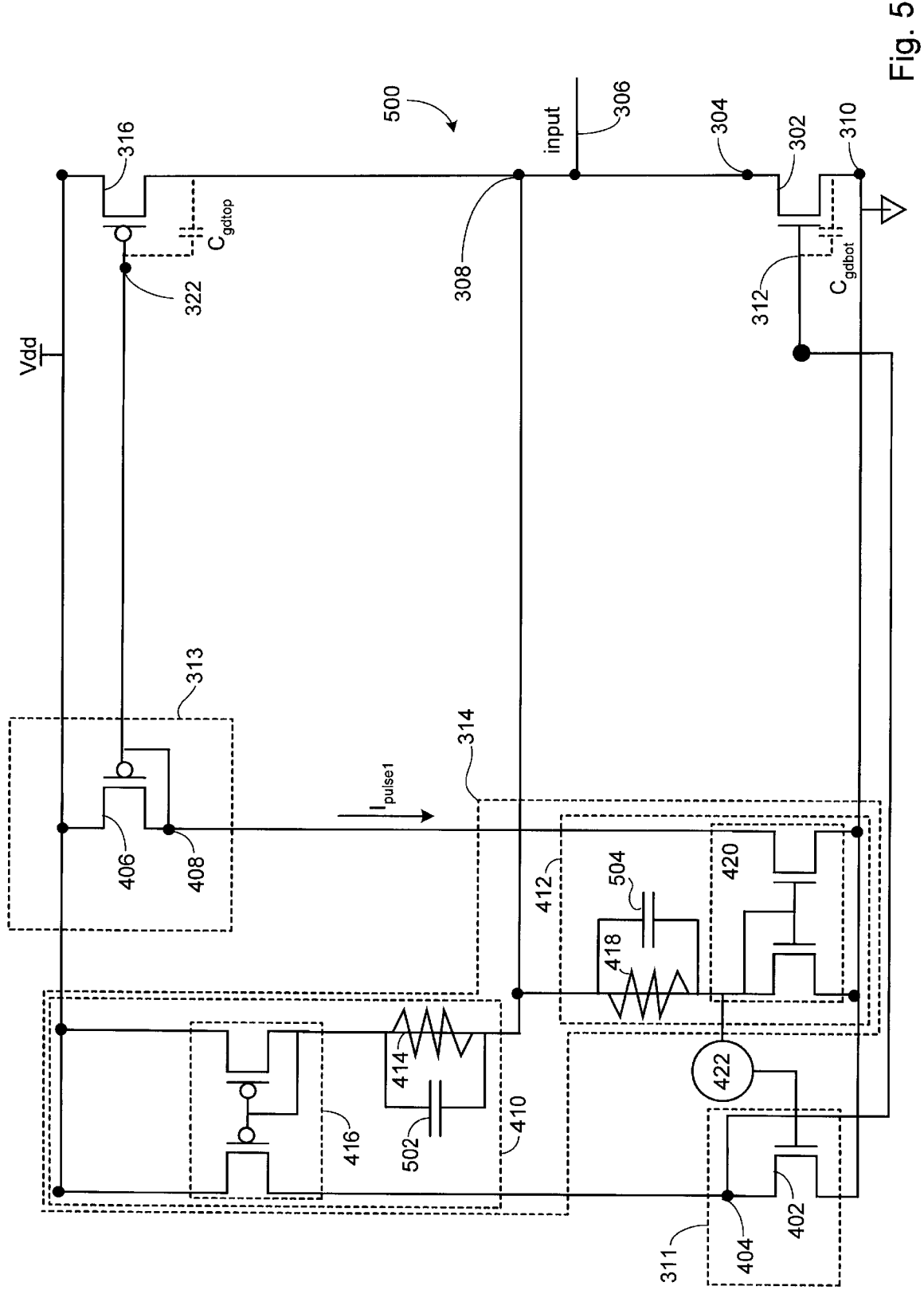
FIG. 5 shows a termination circuit arranged to compensate for the deleterious effects of clamping transistor parasitic capacitances in accordance with an embodiment of the invention.

FIG. 5 shows a termination circuit 500 arranged to compensate for the deleterious effects of clamping transistor parasitic capacitances in accordance with an embodiment of the invention. It should be noted that the circuit 500 is based upon the termination circuit 400 shown in FIG. 4 but the underlying concept of using stabilizing capacitors can be applied to any such termination circuit. Therefore, as shown in FIG. 5, the termination circuit 500 includes a first stabilizing capacitor 502 coupled in parallel to the first resistor 414 and a second stabilizing capacitor 504 coupled in parallel to the second resistor 418. During an high going input transition event (i.e., input signal S goes from a logic "0" to a logic "1"), the stabilizing capacitor 504 causes a transient current pulse $I_{pulse1}$ to flow through the transistor 406 thereby tending to lower the voltage at gate 322 of the upper clamping transistor 316 so as to substantially compensate for the increase in voltage at the gate 322 caused by the parasitic capacitance $C_{gdtop}$. In a similar manner, a low going input transition event will cause the stabilizing capacitor 502 to provide a transient current pulse that compensates for the effects of $C_{gdbottom}$.

In some cases, it may be desirable to use the current source 422 to provide 100% of the DC bias current and eliminate the first and second transistor 414 and 418. In this arrangement, the deleterious effects of clamping transistor parasitic capacitances $C_{gdtop}$ and $C_{gdbot}$ are still substantially eliminated but without the concomitant DC power dissipation reduction afforded by the presence of the resistors 414 and 418.

Other advantages of using the circuits presented in FIGS. 4 and 5 to dynamically change the gate voltages is that the associated clamping transistors can be made smaller, thereby reducing their corresponding parasitic capacitances while still maintaining superior clamping characteristics.

Figure 6:
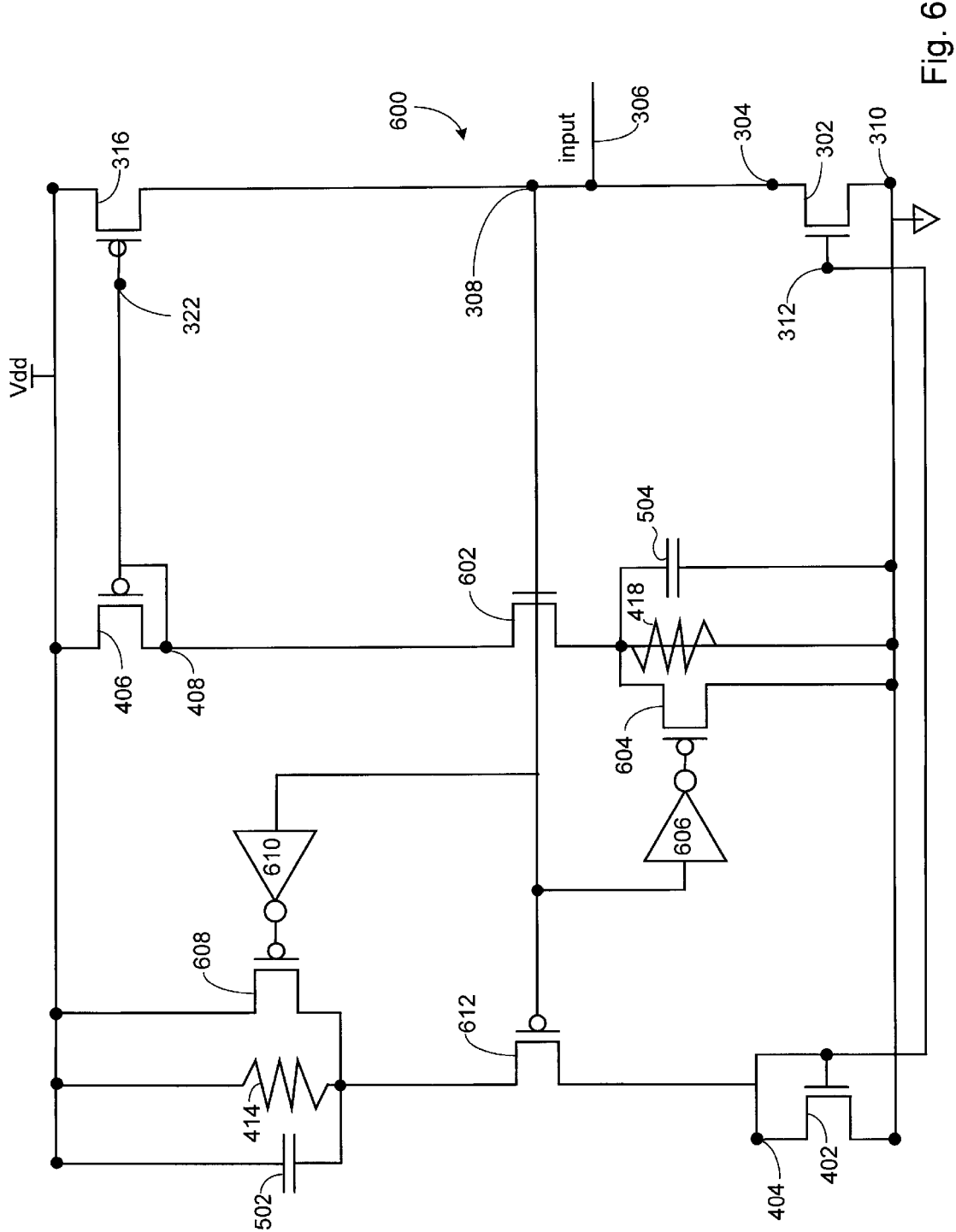
FIG. 6 illustrates a termination circuit in accordance with an embodiment of the invention.

FIG. 6 illustrates a termination circuit 600 in accordance with an embodiment of the invention. It should be noted that the circuit 600 is one particular implementation of the circuit 300 shown in FIG. 3. If an input signal S is at a logic "1", then the bottom clamping transistor 302 is not required. In this case, the transistor 612 will be off and no current will flow through it and assuming that there are no optional current sources present, there will be no current through the bottom clamping transistor 302 since the gate 312 is at GND and the gate-to-source voltage of the transistor 302 is substantially zero (i.e., well below $V_{th}$).

When the input signal S transitions from a logic "1" to a logic "0", then the transistor 612 is switched on such that current can flow through it. Since the drain to source resistance of the transistor 612 is relatively low, the gate to drain voltage of the transistor 402 will rise up to approximately Vth with an initial current transient as the capacitor 502 charges thereby counteracting the effects of the parasitic capacitance $C_{gdbot}$. When the capacitor 502 fully charges, this current transient will cease and only the DC current due to the first resistor 414 remains keeping the gate 312 of the bottom clamping transistor 302 at about Vth while the input signal S is at a logic "0". It should be noted that the capacitor 502 be fully discharged while the input signal S is at a logic "1" since if the first resistor 414 is too high in value (i.e,. the RC time constant is too large for full discharge), then optional components transistor 608 and inverter 610 can be used to provide a low resistance current path across the capacitor 502 only while the input signal S is at a logic "1". It should be noted that a similar analysis applies when the input signal S is at a logic "0" and transitions from a logic "0" to a logic "1" with regards to the transistor 602, capacitor 504, and optional components transistor 604 and inverter 606.

Additional circuit improvements can be made if the desired clamping duration is known. For example, if the input 308 is connected to a transmission line 306 that is of a known length (for example, 1 foot) then any logic transition will be accomplished by a primary current pulse lasting approximately 4 nsec (after 4 nsec, the current pulse will deteriorate due in part to signals reflecting along the transmission line 306). Having this knowledge, a circuit designer can optimize the circuit 600 so as to clamp the signal S "extra hard" for 4 ns of the current pulse by including a 4 ns delay in the inverters 606 and 610. When so included, when the input signal transitions from a logic "1" to a logic "0", the transistor 612 will switch to a low resistance and the transistor 608 will remain at a low resistance state for an additional 4 ns during which there will be an extra large current flowing from VDD, through the transistors 608 and 612 into the transistor 402. This current will tend to raise the voltage at the gates of 402 and 302 above the nominal value of Vth and provide extra clamping for the 4 ns duration of the primary current pulse at the input node 308. After the 4 ns has elapsed, the transistor 608 will switch off (i.e., change to a high resistance state) and the current flowing into the transistor 402 will reduce to that from the capacitor 502 and the resistor 414 only.

While this invention has been described in terms of several preferred embodiments, there are alterations, permutations, and equivalents that fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An active termination circuit for terminating a signal traversing on a transmission line of an electronic device, comprising:

a bottom clamping transistor coupled to a first potential having a bottom clamping transistor control node arranged for clamping said signal at about a first reference voltage;

a bottom threshold reference transistor coupled to a first reference voltage supply configured to supply the first reference voltage, wherein the bottom threshold reference transistor provides a first bias voltage to said bottom clamping transistor control node that biases said bottom clamping transistor control node at about a first threshold voltage above said first reference voltage, said first threshold voltage representing a threshold voltage of said bottom clamping transistor;

a top clamping transistor coupled to a second potential having a top clamping transistor control node arranged for clamping said signal at about a second reference voltage;

a top threshold reference transistor coupled to a second reference voltage supply configured to supply the second reference voltage, wherein said top threshold reference transistor provides a second bias voltage to said top clamping transistor control node that biases said top clamping transistor control node at about a second threshold voltage below said second reference voltage, said second threshold voltage representing a top clamping transistor threshold voltage; and a variable current supply coupled to the bottom threshold transistor and the top threshold transistor arranged to supply a first bias current to the bottom threshold transistor and a second bias current to the top threshold transistor based upon said signal, wherein the variable current supply includes, a first current source arranged to provide a first bias current to the bottom threshold reference transistor based upon the signal, and a second current source arranged to provide a second bias current to the top threshold reference transistor based upon the signal, wherein the first current source and the second current source are anti-phase to each other so as to reduce the average DC power dissipation of the circuit.

2. A circuit as recited in claim 1, wherein the first potential is GND and wherein the second potential is VDD.

3. A circuit as recited in claim 1 wherein said bottom clamping transistor, said top clamping transistor, said bottom threshold reference transistor, and said top threshold reference transistor are fabricated using MOS technology.

4. A circuit as recited in claim 1, wherein the first potential is VDD and wherein the second potential is GND.

5. A circuit as recited in claim 1, wherein the first current source includes a first current mirror coupled to a first resistor and the transmission line, and wherein the second current source includes a second current mirror coupled to a second resistor that is in turn connected to the first resistor and the transmission line such that when the signal is a HIGH signal, the second current mirror supplies the top threshold reference transistor the second bias current and the first current mirror is turned off, and wherein when the signal is a LOW signal, the first current mirror supplies the bottom threshold reference transistor the first bias current and the second current mirror is turned off.

6. A circuit as recited in claim 5 wherein the bottom clamping transistor, the top clamping transistor, the bottom threshold reference transistor, the top threshold reference transistor, the first current mirror and the second current mirror are fabricated using MOS technology.

7. A circuit as recited in claim 6, wherein the first current mirror is formed of p-channel MOS transistors and wherein the second current mirror is formed of n-channel MOS transistors.

8. A circuit as recited in claim 5, wherein the second current source further includes a second stabilizing capacitor connected in parallel with the second resistor.

9. A circuit as recited in claim 5, wherein the first current source further includes a first stabilizing capacitor connected in parallel with the first resistor.

10. A method for terminating a signal traversing on a transmission line of an electronic device, comprising:

forming a clamping circuit including,
coupling a bottom clamping transistor having a bottom clamping transistor control node to a first potential wherein the bottom clamping transistor is arranged to clamp said signal at about a first reference voltage;
coupling a bottom threshold reference transistor to a first reference voltage supply configured to supply the first reference voltage, wherein the bottom threshold reference transistor provides a first bias voltage to said bottom clamping transistor control node that biases said bottom clamping transistor control node at about a first threshold voltage above said first reference voltage, said first threshold voltage representing a threshold voltage of said bottom clamping transistor;
coupling a top clamping transistor to a second potential having a top clamping transistor control node arranged for clamping said signal at about a second reference voltage;
coupling a top threshold reference transistor to a second reference voltage supply configured to supply a second reference voltage, wherein said top threshold reference transistor provides a second bias voltage to said top clamping transistor control node that biases said top clamping transistor control node at about a second threshold voltage below said second reference voltage, said second threshold voltage representing a top clamping transistor threshold voltage; and
coupling a variable current supply coupled to the bottom threshold transistor and the top threshold transistor arranged to supply a first bias current to the bottom threshold transistor and a second bias current to the top threshold transistor based upon the signal, wherein the variable current supply includes,
a first current source arranged to provide a first bias current to the bottom threshold reference transistor based upon the signal, and
a second current source arranged to provide a second bias current to the top threshold reference transistor based upon the signal, wherein the first current source and the second current source are anti-phase to each other so as to reduce the average DC power dissipation of the circuit.

11. A method as recited in claim 10, wherein the first potential is GND and wherein the second potential is VDD.

12. A method as recited in claim 10 wherein said bottom clamping transistor, said top clamping transistor, said bottom threshold reference transistor, and said top threshold reference transistor are fabricated using MOS technology.

13. A method as recited in claim 10, wherein the first potential is VDD and wherein the second potential is GND.

* * * * *